(12) United States Patent
Darcy, III et al.

(10) Patent No.: US 7,229,523 B2
(45) Date of Patent: Jun. 12, 2007

(54) TREATMENT FOR ULTRASONIC WELDING

(75) Inventors: John Joseph Darcy, III, Webster, NY (US); Michael Stephen Roetker, Webster, NY (US); David W. Martin, Walworth, NY (US); Felix J. Santana, San German, PR (US); Scott Griffin, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/095,182

(22) Filed: Mar. 31, 2005

(65) Prior Publication Data

US 2006/0225842 A1  Oct. 12, 2006

(51) Int. Cl.
*B32B 37/00* (2006.01)

(52) U.S. Cl. ............... 156/580.2; 310/323.18

(58) Field of Classification Search ........ 156/73.1, 156/580.1, 580.2; 425/174.2; 228/110.1, 228/1.1; 310/323.15, 323.18
See application file for complete search history.

(56) References Cited

U.S. PATENT DOCUMENTS

| 4,265,990 | A | 5/1981 | Stolka et al. |
| 4,883,742 | A | 11/1989 | Wallbillitch et al. |
| 5,385,662 | A | 1/1995 | Kurze et al. |
| 5,487,825 | A | 1/1996 | Kurze et al. |
| 5,552,005 | A | 9/1996 | Mammino et al. |
| 6,336,982 | B1 | 1/2002 | Yu |
| 6,385,429 | B1 | 5/2002 | Weber et al. |
| 6,523,732 | B1 * | 2/2003 | Popoola et al. ........ 228/1.1 |
| 6,815,131 | B2 | 11/2004 | Darcy |
| 6,849,836 | B2 | 2/2005 | Yu |

* cited by examiner

*Primary Examiner*—James Sells
(74) *Attorney, Agent, or Firm*—Pillsbury Winthrop Shaw Pittman, LLP

(57) ABSTRACT

A metal welding horn having tripartite ceramic coating on its welding horn tip.

17 Claims, 3 Drawing Sheets

FIG. 1 (Priror Art)

TREATMENT FOR ULTRASONIC WELDING

BACKGROUND

All references cited in this specification, and their references, are incorporated by reference herein in their entirety where appropriate for teachings of additional or alternative details, features, and/or technical background.

Flexible imaging belts include electrophotographic imaging belts, ionographic/electrographic imaging belts, and intermediate image transfer belts for transferring toner images used in an electrophotographic or an electrographic imaging system. Such flexible imaging belts may include photoreceptor layers containing a substrate, an electrically conductive layer, an optional hole blocking layer, an adhesive layer, a charge generating layer, and a charge transport layer and, in some embodiments, an anti-curl backing layer. A layered photoreceptor having separate charge generating (i.e. photogenerating) and charge transport layers is described in U.S. Pat. No. 4,265,990.

Flexible imaging belts may be fabricated from a cut sheet of an imaging member web. The sheets which may comprise square, rectangular or parallelogram shapes can be configured into a belt by joining the overlapping opposite marginal ends of the sheet to form a seam. The joining technology may involve welding (including ultrasonic welding), gluing, taping, or pressure heat fusing.

Ultrasonic welding may be the method chosen for joining a flexible imaging member because it is rapid, clean and solvent-free and low cost, as well as because it produces a thin and narrow seam. In addition, ultrasonic welding may be preferred because the mechanical high frequency pounding of the welding horn causes generation of heat at the contiguous overlapping end marginal regions of the flexible imaging sheet loop to maximize melting of one or more layers therein to form a strong and precisely defined seam joint.

Ultrasonic welding is a process that uses high frequency mechanical vibrations above the audible range. The vibrations are produced at the tip of a welding sonotrode or horn. The vibratory force emanating from such a horn device can be generated at high enough frequencies to soften or melt thermoplastic material components intended to be joined together. For example, such frequencies can be effective at 20, 30 or 40 kHz. One of the main advantages of ultrasonic welding may be found in the very short welding steps that enhance its usefulness even in mass production. Weld times may last less than a second. Thus, the process has been utilized in many industries and applications.

Ultrasonic welding can be accomplished at various distances from the horn ranging from only a fraction of a millimeter up to several centimeters. For distant welding the polymer must transmit the energy efficiently, i.e. not be too flexible or have too high a loss modulus. A copolymer of acrylonitrile, butadiene, and styrene (ABS) and high impact polystyrene is among the easiest polymers to weld ultrasonically. Ultrasonic welding will usually join amorphous thermoplastics more readily than semicrystalline ones. However, the advent of more powerful machines has blurred this distinction, and semicrystalline polymers are now welded routinely.

The ultrasonic welding process may entail holding down the overlapped ends of a flexible imaging member sheet with vacuum against a flat anvil surface and guiding the tip end of an ultrasonic vibrating horn transversely across the entire width of the sheet, over and along the overlapped ends, to form a welded seam. The ultrasonic vibration frequency applied for joining the photoreceptor belt/loop ends is kept so high that a frictional heat results upon contact with material to be joined. The heat causes softening or melting of contact portion which results in fusing the joined belt end pieces without any horn burn blemishes in the form of undesirable raised, rough and brittle welds.

Ultrasonic welding is probably the most commonly used thermoplastic welding process because it is very fast (fractions of a second to a few seconds) and usually produces welds that are relatively free of flash. In addition, ultrasonic welding can be automated and thus is particularly suitable for high volume production.

Rapid development of the ultrasonic welding machine has occurred in the last ten years. Basic functions, such as weld energy, collapse, trigger force, and pressure are now microprocessor controlled. In addition, real time feedback and control of welding conditions is being offered, along with the ability to vary weld force and amplitude during the weld cycles.

Welding by ultrasonic devices requires a tool design suitable for the particular task at hand. The mechanical characteristics of the substrate will determine the selection of the welding machine. An ultrasonic welding device typically includes four main components, a power supply, a converter, an amplitude controlling device or booster, and an acoustic tool which is called the horn or sonotrode. The electricity is changed by the power supply, for example, from 50–60 Hz into a high frequency such as 20, 30, or 40 kHz and then supplied to a converter. The converter may comprise discs of piezoelectric crystals wedged between two metal sections and kept tightly compressed to respond to even the slightest pressure change. The converter serves to change the electrical energy into mechanical vibration energy at high ultrasonic frequencies. The vibratory energy is transmitted through the booster. The booster increases the amplitude of the sound wave to the horn.

The horn is an acoustical tool delivering ultrasonic vibratory energy directly to the substrate portions being assembled. In addition, the horn is used to apply welding pressure. The vibrations are transmitted from the horn to the joint area or seam, where the resultant friction causes the surface of the substrate material to soften or melt, and subsequently fuse together. Ultrasonic welding may be used to join flexible image photoreceptor loops as well as intermediate transfer belts and weldable polymer substrate belts.

Flexible image loops photoreceptors and imaging belts may be joined together at opposite ends to form a continuous loop by ultrasonic acoustic welding horns which transfer vibration energy to the bondable substrates. The ultrasonic welding process involves flexing of the slender projection or tip portion of a metallic welding horn member by oscillating at rates of 10,000 to 70,000 times per second (kHz). The oscillation causes the horn tip portion to move across the flexible belt joint area to create a weld or seam. The horn member can be held at a distance from the joint surface suitable for effective mechanical energy delivery to the joint area which rests on its opposite side on, for example, on an anvil ensuring that most of the energy is spent in the weld zone of the joint area. The overlapping ends of the flexible thermoplastic belt sheet consequently melt forming a weld or seam. Frictional heating can also occur to some extent because transmission of the energy through the plastic parts is very complex.

An oscillating force of an ultrasonic horn is generated when alternating electrical power (at frequency) is applied to a train of tuned components that are sized to form a resonant system. The first component converts the electrical power (i.e. voltage) to oscillations. This occurs when the power is applied to a sandwich of piezoelectric or magnetostrictive materials and metal blocks. These oscillations are amplified (or de-amplified) by a booster and the booster is connected to the horn. The horn can either amplify or de-amplify the oscillations, depending on the needs of the application. While the frequency of oscillations vary between 10 and 70 kHz, the most common frequencies are in the range from 20 to 40 kHz. Oscillation amplitudes range from 20 to 80 microns.

The piezoceramic material may include one or more of barium titanate ($BaTiO_3$), lead zirconate titanate (PZT), or lead titanate ($PbTiO_3$). Most preferably, the piezoceramic is PZT. The polymer of the composite may include any suitable binder polymer, and may or may not itself be piezoelectric. Piezoelectric polymers include polyvinylidene fluoride (PVDF), and copolymers of vinylidene fluoride and trifluoroethylene (PVDF/TrFe) or vinylidene fluoride and tetrafluoroethylene (PVDF/TeFe). Other binder polymers may include, for example, epoxies, silicone resins, cyanoacrylates, etc., without restriction. A preferred polymer is an epoxy in that it can also act to strongly adhere the piezoelectric composite to the platform section of the horn member.

The 1–3 configuration nomenclature that identifies the configuration of the piezoelectric composite transducer is known in the art and refers to the two-phase piezoelectric behavior of the material, the first number referencing the physical connectivity of the active phase (z direction) and the second number referencing the physical connectivity of the passive phase (y direction). The 1–3 composite configurations have been found to be most advantageous in achieving consistently uniform tip vibration amplitude. For example, the piezoelectric composite may be bonded with an adhesive layer to horn. A vast array of adhesives such as transfer adhesives, epoxies, cyanoacrylates, or an epoxy/conductive mesh (e.g., metal screen) layer may be used to bond the horn and piezoelectric element together.

Ultrasonic welding may lead to a welding defect known as "Horn Burn." "Horn Burn" results in a raised, rough, and brittle welds, which are all unwanted traits. "Horn Burn" has been associated with the ability of the horn to transfer heat out of the seamed area. While numerous materials have been used in the fabrication of horns, aluminum has shown itself to be an effective head dissipating material. The main disadvantage of aluminum is its inherent softness. The configured ultrasonic horn tip wears away after several weld cycles. The constant wear due to the welding friction results in equipment downtime for converting, the cost of ultrasonic horn tooling, and defective belts. Various ceramic plating methods have been tried in the past to improve the wear resistance of ultrasonic horns, but have shown a tendency to delaminate. In respect of ceramic plating, it has been found that the ultrasonic energy's elongation of the welding horn may break the plating bond after only a few cycles.

SUMMARY

Aspects disclosed include an ultrasonic welding horn comprising a metal form having a bottom portion and a tip portion operatively configured to transmit ultrasonic energy, said tip portion coated with a tripartite structure comprising a metal oxide layer in contact with the tip portion, a dense ceramic layer in contact with said metal oxide layer, and a lenticular porous ceramic layer, wherein the metal is aluminum, titanium, magnesium or an alloy thereof, or a combination thereof, the metal oxide layer comprises a thin layer providing a molecular bonding between said metal and said dense ceramic layer, the dense ceramic coating layer comprises a densely fused ceramic structure, and the lenticular porous coating layer comprises substantially uniformly distributed pores.

A resonator having a top portion and an open bottom portion coated with a tripartite ceramic surface comprising a metal oxide layer, a dense ceramic layer in contact with said metal oxide layer and a lenticular porous layer.

BRIEF DESCRIPTION OF THE DRAWINGS

In the detailed description reference is made to the illustrative figures listed below.

DETAILED DESCRIPTION

Figure 1:
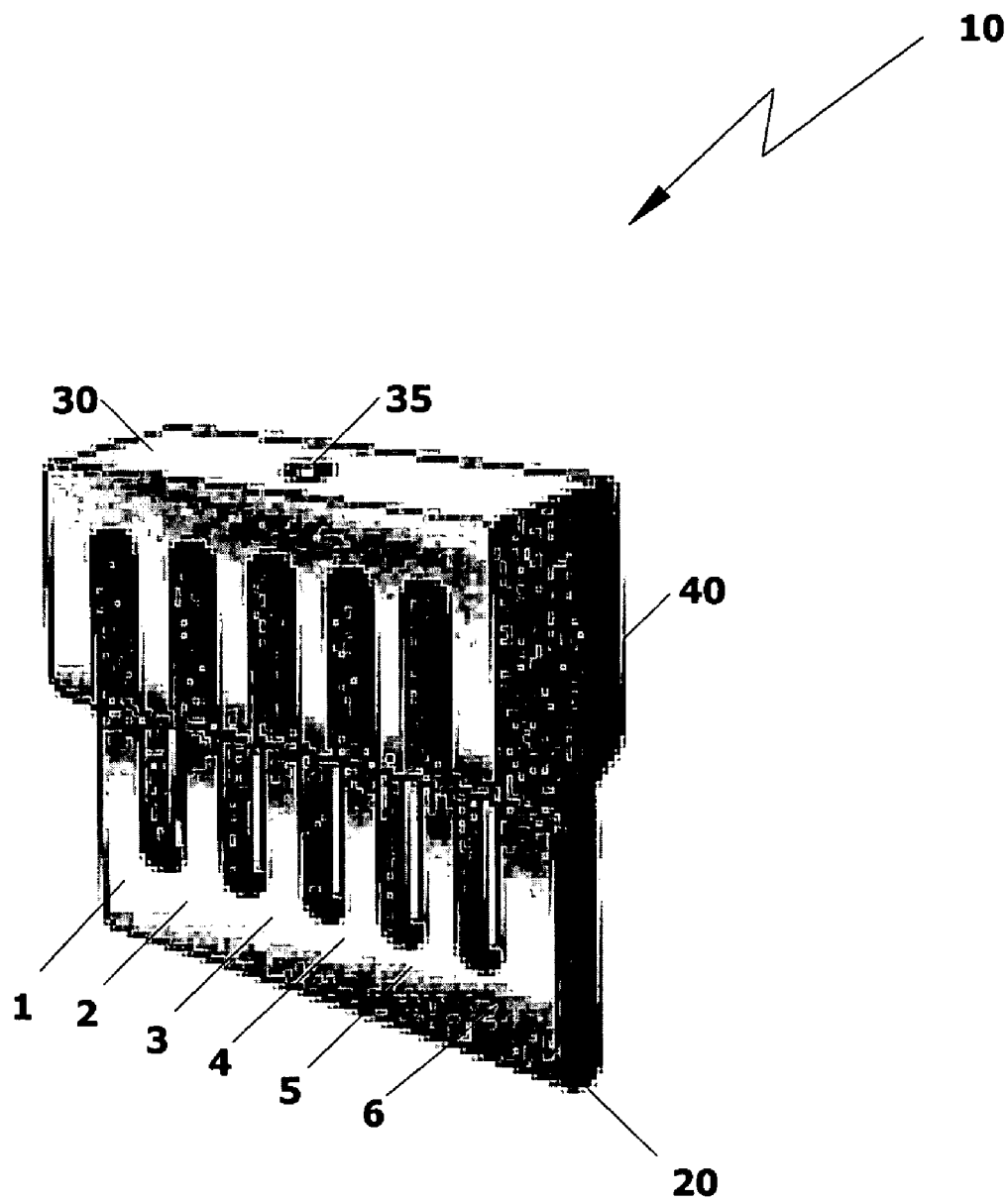
FIG. 1 illustrates an oblique view of an ultrasonic horn (prior art)

In the embodiments there is illustrated a hardened light metal ultrasonic welding horn surface protected by a corrosion, heat and delamination resistant ceramic layer.

In embodiments there is also illustrated a welding horn coating comprising a multilayer comprising a metal oxide layer in contact with the horn, a dense ceramic layer in contact with the metal oxide layer, and a lenticular porous ceramic layer in contact with the dense ceramic layer.

In one embodiment, there is illustrated a special hardening process of light alloy horns that significantly enhances the quality and quantity of acoustic welding fabrication of photoreceptor belts. Such process coats the alloy surface of a metallic horn with a complex ceramics coating to lend improved hardness and wear characteristics, and provide substantially uniform coating. The coating may be applied to only a portion of the ultrasonic welding horn such as the tip to afford sufficient protection against high mechanical stress from vibration, friction and heat, and prevention of "Horn Burn."

In one embodiment of the invention, there is disclosed an ultrasonic horn comprising elemental, or an alloy of, aluminum, magnesium, and/or titanium, and/or mixtures thereof. Such horn may be coated with a coating comprising, in order from the layer farthest from the metal horn to the metal horn itself, a porous ceramic outside layer, a dense main layer of fused ceramics with the fused ceramic closest to the substrate being more dense, and a thinner metal oxide layer providing a molecular bond between the metal or the ceramic coating. The top outside porous layer may further comprise materials such as polytetrafluoroethylene, paint or additive materials such as iron, copper, magnesium, titanium, zirconium, and zinc. The thin intermediate metal oxide layer provides a strong molecular bond between the metal substrate and the dense ceramic matrix and reduces the likelihood of cracking or chipping. The dense ceramic layer provides hardness and wear resistance. The outer porous layer may comprise a lenticular surface with substantially evenly distributed fine pores. Such pores allow for impregnation of materials, such as polytetrafluoroethylene (PTFE), paint, or additive metals including iron, copper, magnesium, titanium, zirconium, and zinc, which leads to better wear resistance and better scratch resistance. The porous outside layer of a PETRALITE™ surface may have a friction coefficient of less than 0.15 against steel, and a hardness range of the dense main layer of about 400 to about 2000 HV, or about 400 HV to about 1000 HV, about 400 to about 500 HV ($R_c$ 35 to 55). A coating of the present disclosure may comprise a tripartite pulsed-voltage ceramic coating such as PETRALITE™. A tripartite pulsed-voltage ceramic coating may be formed using a KERONITE™ process, or a KERONITE™-like process, such as disclosed for example in U.S. Pat. No. 5,385,662, and U.S. Pat. No. 5,487,825. As described in such references, a plasma discharge caused by electrical pulses, preferably of both positive and negative polarities, in pulsed fashion, is caused to interface with the surface of the metal/metal alloy while it is in contact with a low alkaline electrolyte bath concentrate. The bipolar pulsed plasma discharged causes oxidation of the surface (via "plasma electrolytic oxidation" or "PEO"), elementary co-deposition, and the fusion of a metal oxide layer formed on the metal/metal alloy to a deposited ceramic layer. A KERONITE™ process may eventuate in a uniform thickness tripartite coating of about 10 microns to about 60 microns. The alkaline electrolyte bath, useful in a KERONITE™-like process, may for example comprise components useful in the anodization process such as the chloride-free electrolytic bath of Example 1 of U.S. Pat. No. 5,487,825. The bath need not contain chrome or ammonia.

When magnesium materials are the metal/metal alloy substrate upon which a tripartite pulsed-voltage ceramic coating is placed, a layer of spinel ($MgAL_2O_4$) may predominate in the dense ceramic layer. When aluminum materials are used as the substrate, corundum may predominate in the dense ceramic layer.

By "ceramic" it is meant to include a chemical inorganic, except metals and alloys, that are manufactured by the action of heat. Generally, ceramics comprise both cationic and anionic species and possess ionic bonding.

The high frictional and heat energy of an ultrasonic welding routine tends to wear away the smoothly plated or polished tip of the horn during the welding operation. The resulting downtime of the welding process for repair and converting equipment is expensive in both time and material. Various ceramic plating methods have been tried but have failed by delaminating the exogenous plating layers. A tripartite pulsed-voltage ceramic coating applied to the horn tip portion protects the tip surface, and overcomes the fragility of welding horns made from light metal alloys.

The hardness of the tripartite pulsed-voltage ceramic coating may range from about 400 to about 2000 HV, depending on the type of alloy and the depth of the applied coating. With respect to PETRALITE™, high corrosion resistance is observed in that the treated alloys remain unaffected in corrosive salt baths for over 2000 hours and withstand continuous exposures to temperatures as high as 500° C., and for brief periods, thermal shocks of up to 2000° C., without apparent damage. Suitable alloys for coating include magnesium and titanium alloys which may contain admixtures of copper, magnesium, silicon, zinc, and/or iron.

Contrary to conventional plating methods whereby hard substances are added to a substrate surface, the hardening treatment of, for example, the aluminum-based alloy substrate by the pulsed-voltage ceramic coating technique involves a reaction directly transforming the substrate surface creating atomic bonds between the metallic substrate and the metal oxide-ceramic coating. The method may achieve a uniform coat of controlled thickness regardless of shape of the treated substrate.

Additional layers may be bonded to the porous outer ceramic surface. Depending on need, the coating thickness may be adjusted from a thin anticorrosion layer to a thick thermal resistant layer. The specific coating layer is selected at a suitable thickness providing the best wear resistance while avoiding a thickness that may dampen the effective working vibration.

The treated alloy substrate forms a complex, fused ceramic plating microstructure exhibiting hard crystalline phases which are distributed in a matrix of softer phases of oxide. The embodiment of the in situ modification of alloy surfaces is achieved by a reaction that converts the substrate alloy, such as aluminum, into a bonded oxidized alloy layer which thickness increases with time of reaction. This protective structural configuration gives the surface of the horn tip portion alloy, combined properties of considerable hardness and wear resistance, and resistance against failure from shock and vibration. The combination of high dielectric strength and heat resistance of treated alloy surface serves to make the ultrasonic operation of such a resonating welding horn durable.

The tripartite voltage pulsed ceramic coated horn may be used in various arrangements or systems of ultrasonic welding of photoreceptor belts. One method forms a flexible photoreceptor belt by joining a first and second end into a flexible member loop overlapping the first end and the second end in an overlap region for a selected distance. The process provides a photosensitive surface of the photoreceptor belt on the outside of the loop while positioning a welding tool on an inside surface of the loop shape of the flexible member opposite the overlap region and ultrasonically welding the flexible member at one or more locations along the overlap region producing a photoreceptor belt. Another method of forming a flexible belt keeps the photosensitive surface of the photoreceptor belt on the outside of the loop shape, ultrasonically welding the flexible member from the inside of the loop at one or more locations along the overlap region with an ultrasonic horn directed to the work surface. A further method of forming a flexible photoreceptor belt provides the photosensitive surface on the outside of the loop while positioning the overlap region of the member in a pressure contact with a work surface with the photosensitive surface on the outside of the loop ultrasonically welding the flexible member at one or more locations along the overlap region using an ultrasonic horn; and then turning the flexible member inside out after the welding step to move the photosensitive surface originally formed on the inside of the loop to the outside of the flexible belt loop. Another process of producing a flexible photoreceptor belt provides a photosensitive surface on the outside of the loop shape keeping the first end and the second end of the flexible member on the photosensitive surface, wherein the overlap region and the photosensitive surface are in pressure contact with a work surface. With the photosensitive surface of the flexible member on the outside of the loop shape, the ultrasonic welding transverses along the overlap region. Yet another method of forming a flexible photoreceptor belt positions the overlap region of the flexible member at the joining point in pressure contact with the work surface keeping the selected surface on the outside of the loop shape, creating a second dimensional area. As the welding tool is adjacent an inside surface of the flexible member loop opposite the overlap region, the welding tool has a third dimensional contact area for ultrasonically welding the flexible member along the overlap region forming a belt.

In addition to improving ultrasonic welding horns, the tripartite voltage pulsed ceramic may also improve resonators used to apply vibratory mechanical energy to a member.

A resonator includes an energy transmitting horn member combining a platform portion and a horn portion which forms a contacting portion for contacting a surface of the member. The design of a resonator may include a piezoelectric material in association with the horn member for driving the horn member to vibrate. The piezoelectric material may be responsive to a voltage signal from a voltage source, and may be composed of at least one piezoceramic material and at least one of a polymer or air, at a 1–3 configuration.

FIG. 1 shows an oblique view illustrating a multi-horn component 10 (prior art) where the horn tip assembly 20 is a side-by-side combination of horn segments 1, 2, 3, 4, 5 and 6, extending from a base 40 containing an optional piezoelectric layer 30 and an electric cable attachment receptacle 35. When horn 10 is fully segmented, each horn segment tends to act as an individual horn. When the horn is segmented though the tip, producing an open-ended slot, each segment acts more or less individually in its response. It will be understood that the exact number of segments may vary from the six segments shown in the Figure.

Figure 2:
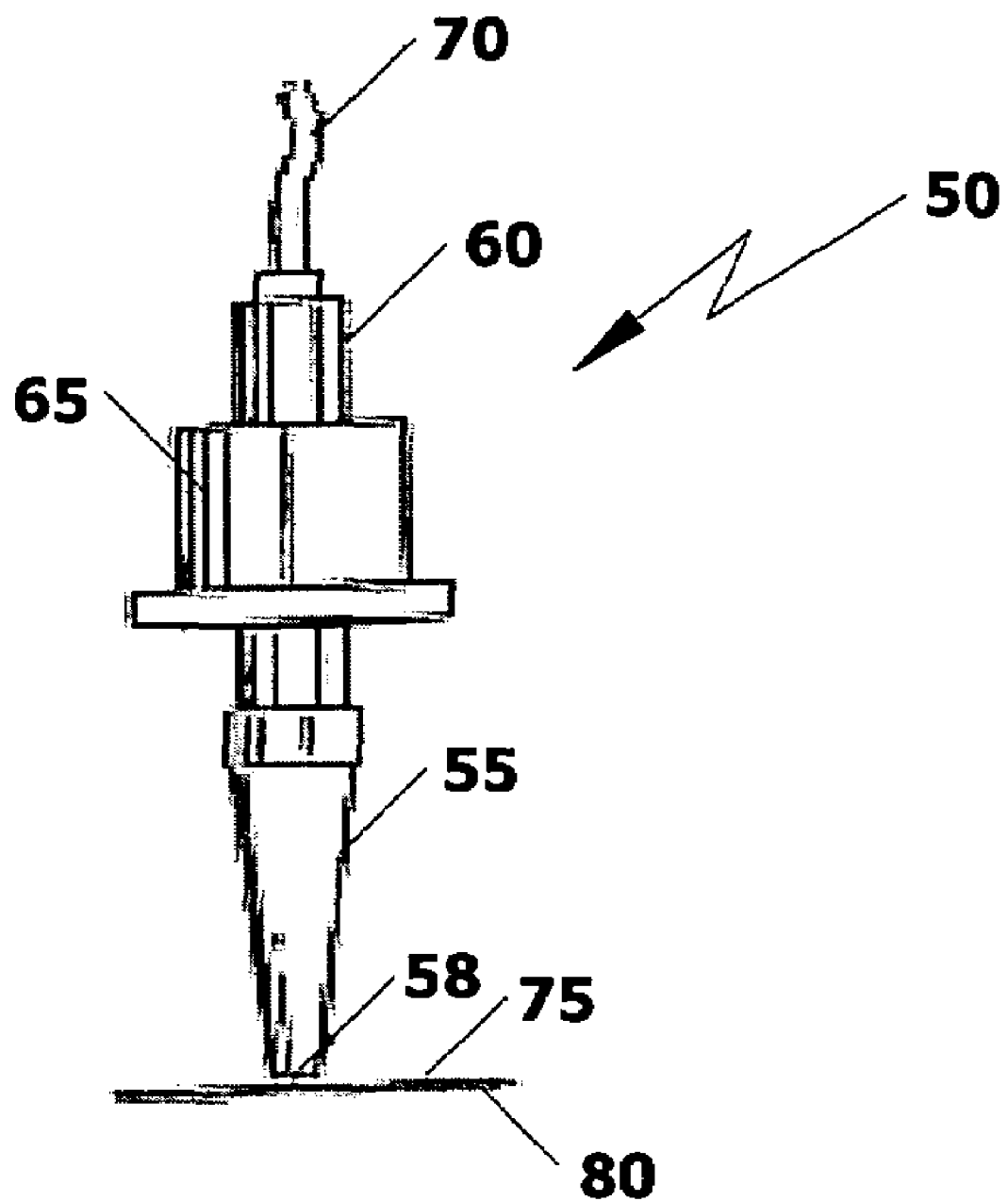
FIG. 2 illustrates a cross-sectional view of an ultrasonic horn assembly.

FIG. 2 (prior art) depicts a cross-section of a stack assembly 50 of an ultrasonic welding device wherein the horn portion 55 is attached to a booster 60 which in turn is attached to a transducer 65. The stack represents a tuned resonator wherein the tuned welding stack 50 matches the frequency of the electrical signal from the generator (cable 70) to within about 30 Hz. The tip surface 58 is directed to the work surface 75 of a photoreceptor belt joining portion 80.

Figure 3:
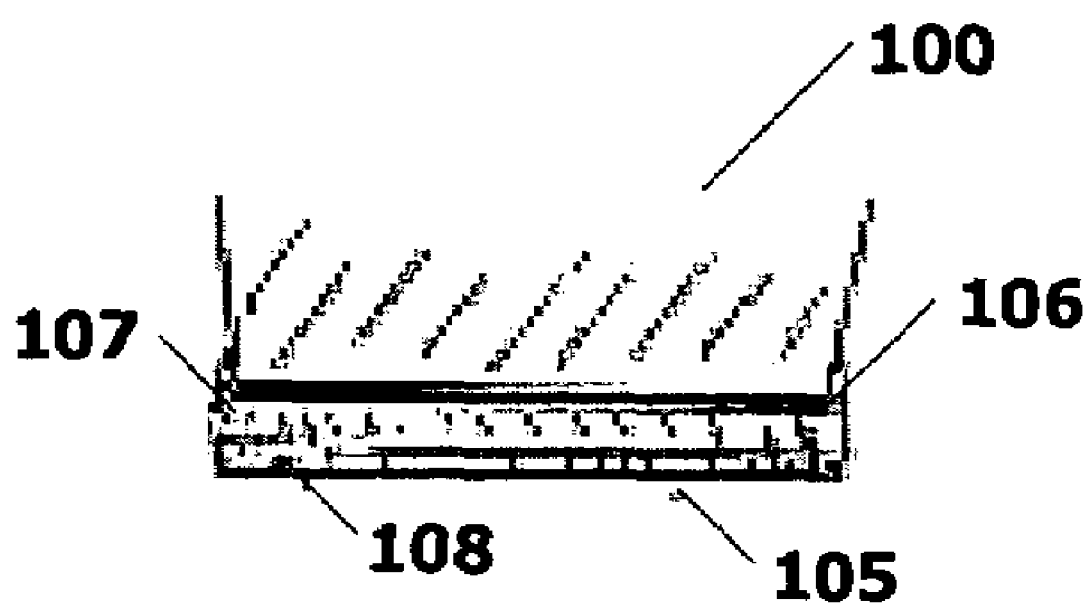
FIG. 3 illustrates a multi-layered protective plating on an ultrasonic horn tip surface.

FIG. 3 depicts a cross-section of an ultrasonic tip 100 covered with a tripartite pulsed-voltage protective ceramic surface 105 (PETRALITE™) combining a thin molecular oxide bonding inner layer 106, a structural stabilizer dense ceramic middle layer 107 and a porous ceramic outer layer 108.

While the invention has been particularly shown and described with reference to particular embodiments, it will be appreciated that variations of the above-disclosed and other features and functions, or alternatives thereof, may be desirably combined into many other different systems or applications; also that various presently unforeseen or unanticipated alternatives, modifications, variations or improvements therein may be subsequently made by those skilled in the art which are also intended to be encompassed by the following claims.

What is claimed is:

1. An ultrasonic welding horn comprising:
   a metal substrate having a bottom portion and a tip portion operatively configured to transmit ultrasonic energy;
   wherein the tip portion is coated with a tripartite oxide-ceramic coating having a total thickness of about 10 microns to about 40 microns and comprising:
   a metal oxide layer in contact with the metal tip portion;
   a dense ceramic coating layer in contact with said metal oxide layer, the dense ceramic coating layer having a hardness of about 400 to about 2000 HV; and
   a lenticular porous ceramic layer in contact with said dense ceramic layer.

2. An ultrasonic welding horn in accordance with claim 1, wherein the metal of the metal substrate is aluminum, titanium, magnesium or an alloy thereof, or a combination thereof.

3. An ultrasonic welding horn in accordance with claim 1, wherein the metal oxide layer comprises a thin layer providing molecular bonding between said metal and said dense ceramic layer.

4. An ultrasonic welding horn in accordance with claim 2, wherein the dense ceramic coating layer comprises a densely fused ceramic structure.

5. An ultrasonic welding horn in accordance with claim 2, wherein the lenticular porous ceramic coating layer has substantially uniformly distributed pores.

6. An ultrasonic welding horn in accordance with claim 5, wherein the lenticular porous ceramic coating layer is impregnated with a material selected from the group consisting of polytetrafluoroethylene, silicon, copper, iron, zinc, magnesium, zirconium, and titanium.

7. An ultrasonic welding horn in accordance with claim 1, wherein the lenticular porous ceramic coating layer contains pigment.

8. An ultrasonic welding horn in accordance with claim 1, wherein the tripartite oxide-ceramic coating is created by pulsed-voltages of positive and negative polarity.

9. An ultrasonic welding horn in accordance with claim 1, wherein the lenticular porous ceramic layer has a friction coefficient of less than 0.15 against steel.

10. An ultrasonic welding horn in accordance with claim 1, wherein the tripartite oxide-ceramic coating comprises spinel and/or corundum.

11. A resonator comprising:
    a top portion; and
    an open bottom portion coated with a tripartite oxide-ceramic coating having a total thickness of about 10 microns to about 40 microns and comprising:
    a light metal oxide coating layer;
    a dense ceramic coating layer in contact with said metal oxide coating layer, the dense ceramic coating layer having a hardness of about 400 to about 2000 HV; and
    a lenticular porous ceramic layer in contact with the dense ceramic layer.

12. A resonator in accordance with claim 11, wherein further comprising a piezoelectric material between said top portion and said bottom portion.

13. A resonator in accordance with claim 11, wherein the dense ceramic coating layer comprises a spinel and/or corundum.

14. A resonator in accordance with claim 13, wherein the lenticular porous ceramic coating layer is modified with a coating substance.

15. A resonator in accordance with claim 14, wherein the coating substance comprises PFTE, paint/pigment, or metal.

16. A resonator in accordance with claim 15, wherein the metal comprises iron, copper, zinc, titanium, zirconium, or magnesium.

17. A resonator in accordance with claim 11, wherein the resonator comprises a substrate material of aluminum, titanium, or magnesium.

* * * * *